No. 691,962. Patented Jan. 28, 1902.
C. F. NICKEY.
LIFTING AND CONVEYING APPARATUS.
(Application filed June 29, 1901.)
(No Model.) 7 Sheets—Sheet 1.

WITNESSES:
Wm H Payne
A. L. Bush

INVENTOR:
Chas. F. Nickey.
BY E. T. Silvius,
ATTORNEY.

No. 691,962. Patented Jan. 28, 1902.
C. F. NICKEY.
LIFTING AND CONVEYING APPARATUS.
(Application filed June 29, 1901.)
(No Model.) 7 Sheets—Sheet 3.

WITNESSES:
Wm H Payne
A. C. Bush

INVENTOR:
Chas. F. Nickey.
BY E. T. Silvius,
ATTORNEY.

No. 691,962. Patented Jan. 28, 1902.
C. F. NICKEY.
LIFTING AND CONVEYING APPARATUS.
(Application filed June 29, 1901.)

(No Model.) 7 Sheets—Sheet 4.

WITNESSES:
Wm H Payne
A. C. Bush

INVENTOR:
Chas. F. Nickey.
BY E. T. Silvius.
ATTORNEY.

No. 691,962.  
C. F. NICKEY.  
LIFTING AND CONVEYING APPARATUS.  
(Application filed June 29, 1901.)  
Patented Jan. 28, 1902.

(No Model.)  
7 Sheets—Sheet 5.

Fig. 11.

WITNESSES:  
Wm H Payne  
A. C. Bush

INVENTOR:  
Chas. F. Nickey  
BY  
E. J. Silvius  
ATTORNEY.

No. 691,962. Patented Jan. 28, 1902.
C. F. NICKEY.
LIFTING AND CONVEYING APPARATUS.
(Application filed June 29, 1901.)
(No Model.) 7 Sheets—Sheet 6.

WITNESSES:
Wm H Payne
A. C. Bush

INVENTOR:
Chas. F. Nickey,
BY E. T. Silvius,
ATTORNEY.

No. 691,962. Patented Jan. 28, 1902.
C. F. NICKEY.
LIFTING AND CONVEYING APPARATUS.
(Application filed June 29, 1901.)
(No Model.) 7 Sheets—Sheet 7.

WITNESSES:
Wm. H. Dyne
Q. C. Bush.

INVENTOR:
Chas. F. Nickey,
BY E. T. Silvius,
ATTORNEY.

UNITED STATES PATENT OFFICE.

CHARLES F. NICKEY, OF CLAY CITY, INDIANA.

LIFTING AND CONVEYING APPARATUS.

SPECIFICATION forming part of Letters Patent No. 691,962, dated January 28, 1902.

Application filed June 29, 1901. Serial No. 66,457. (No model.)

*To all whom it may concern:*

Be it known that I, CHARLES F. NICKEY, a citizen of the United States, residing at Clay City, in the county of Clay and State of Indiana, have invented certain new and useful Improvements in Lifting and Conveying Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a stationary power-machine to which actuating force or power may be applied, a track, a carriage operated by the machine, a lifting-cable operated also by the machine, and means by which the operating parts are connected and operated, such apparatus being designed to lift and safely suspend loads, to transfer the loads from one point to another while safely supported, and to then deposit the loads at any desired place within the range of the apparatus.

The object of the invention is to provide improved apparatus of this character which may be cheaply constructed and erected, of simple compact design, and durable and economical in use.

Referring to the drawings.

Similar reference characters in the several figures of the drawings indicate corresponding parts.

The supporting-timbers generally for the apparatus are designated by $a$, and $d\ d'$ indicate the frames generally, as well as the two opposing sides thereof by which the mechanism of the power-machine is connected and supported.

$e$ designates the tail-stock, comprising practically a part of the power-machine; $c\ c'$, the track-rails for the carriage; $b\ b'$, the hangers for the track-rails; $f$, the carriage-frame as a whole; $g$, the tail-stock for the carrying-cable; $h\ h'$, the safety-hooks for carrying the load; $i$, the sheave-frame for the lifting-hook; $j$, the lifting-drum; $k$, the spreading pulley or sheave for the lifting-cable; $l\ m$, the carriage-sheaves, over which the lifting-cable runs; $n$, the sheave by which the load is supported on the lifting-cable; $o$, the carrying-pulley; $p$, the spreading-pulley for the carrying-cable; $q$, the lifting-cable; $r$, the carrying-cable, and $s$ the lifting-hook.

In construction the hangers $b\ b'$ are preferably connected together by a plate 50, so as to form arches, being thus more easily placed and maintained in alinement. The rails $c\ c'$ are bolted to the lower ends of the hangers, which are suitably offset. The frames $d\ d'$ are attached to a base 1, adapted to be secured to the overhead timbers $a$. Suitable rotative shafts 2 and 3 are mounted in the frames, transversely thereof, and other rotative shafts 4 and 5 are mounted longitudinally of the frames. A shifting bar 6 is mounted parallel to and near the shaft 4, and a similar bar 7 is mounted parallel to and near the shaft 5. A shaft 8 is mounted parallel to the shafts 4 and 5, preferably in a higher plane, as shown. A worm-wheel 9 and the drum $j$ are mounted on the shaft 2 and connected so as to rotate together, preferably by attaching both to the shaft, as they must rotate with the shaft, and a screw or worm 10 is secured to the shaft 5 and engages the wheel 9, so that the drum $j$ may be driven by the shaft 5. Although I now employ the screw-gear, it is obvious that I may substitute bevel gear-wheels and arrange the shafts accordingly.

On the shaft 3, which is arranged at the end of the machine opposite to that at which the shaft 2 is situated, are the carriage-cable-driving pulley $o$ and a bevel gear-wheel 11, both secured to the shaft, the wheel 11 being engaged by a bevel gear-wheel 12, secured to the shaft 4, so that the shaft 4 may drive the shaft 3.

One end of the shaft 2 projects beyond its supporting-frame and has screw-threads 13, on which is a screw-fitted collar 14, adapted to work over the threads of the shaft and to be moved thereby along the shaft, this collar having an arm 15 attached thereto. A collar 16 is secured adjustably to the shaft 2 as a stop for the collar 14 and the arm 15. The arm 15 has an aperture 17 near its outer end, which may be either circular, square, or oblong. A pull-bar 18 has a stud 19 extending through the aperture 17, and the bar 18 also has a collar 20 mounted slidingly on the rod 7 and may act against a coiled spring 21, also on the rod 7, the spring being suitably adjusted under slight tension by a collar 22, secured to the rod 7, so that the force of the spring is exerted indirectly against the bracket 23, which partially supports the rod 7, the opposite end of which is supported by a bracket 24, against which a coiled spring 25 is seated and mounted on the rod 7, the opposite end of this spring being pressed by a collar 26, secured to the rod 7. A shifting arm 27 is secured to the rod 7 and engages a shifting sleeve 28, that is mounted on the shaft 5, splined so that it must rotate with the shaft, yet may slide on it. The sleeve 28 has conical ends, in the surface of one of which is a groove 29, adapted to receive the ends of expansion-arms 30. At the opposite end of the sleeve the cone is adapted to be engaged by the ends of arms 31. The arms 30 are suitably connected to friction-clutch devices adapted to engage a pulley 38, loose on the shaft 5, and the arms 31 are similarly connected so as to operate a clutch for engaging a pulley 32, also loose on the shaft 5, such types of clutches being well known. A belt 34 runs on the pulley 32, and a belt 35 runs on the pulley 33, the belts being suitably driven in opposite directions. The rod 7 is supported in brackets 36 and 37 and is normally held in a proper position by a fixed collar 38 and a spring 39, seated between the collar and the bracket 36, and by a fixed collar 40 and a spring 41, seated between the collar 40 and the bracket 37. An arm 42 is attached to the rod 6 and engages a shifting sleeve 43, slidingly mounted on the shaft 4, this sleeve also having conical ends to be engaged by clutch-arms 44 and 45 for putting into operation opposite pulleys 46 and 47, loosely mounted on the shaft 4 and provided with suitable clutches operated by the arms 44 and 45. The belt 34 runs under and against the pulley 46, and the belt 35 runs under and against the pulley 47, thereby driving also these pulleys. A pulley 48 is mounted on the shaft 8, and over th is the belt 34 runs, while the belt 35 runs over a pulley 49, also mounted on the shaft 8. These pulleys 48 and 49 may run loose on their shaft, or they may be secured to the shaft and the shaft be mounted rotatively, as is obvious.

Figure 14:
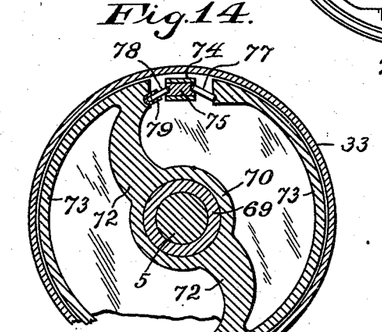
Fig. 14, a fragmentary sectional view on a line C C, Fig. 12, showing the means for spreading the friction-ring and also its relation to the pulley.
Figure 15:
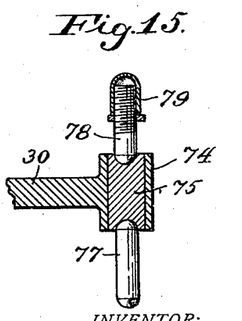
Fig. 15, a fragmentary detail view showing the connections between the friction-ring and the expansion-arm therefor.

The four friction-clutch pulleys 32 33 46 47 above referred to are preferably alike, each comprising as a whole a crown-face pulley, as 32 or 33, mounted rotatively on its shaft and having the inner side of the rim bored true. Its hub 69 has its exterior surface turned true at one end thereof, and the ends of the hub are faced. A hub 70 is secured to the pulley-shaft, as 5, adjacent to the hub 69 and is suitably faced, so as to act as a collar for the hub 69. Ears 71 are attached to the hub 70, and the expansion-arms, as 30, are pivoted to these ears. Two oppositely-disposed arms, as 72, extend from the hub 70, being attached rigidly thereto, and support a split expansible friction-ring 73, one end of one-half part of the ring being supported by one arm 72, and one end of the other one-half part of the ring being supported by the other arm 72, so that there are two openings in the ring 73, arranged adjacent to the ends of the arms 72. The ends 74 of the expansion-arms, as 30, extend into the openings in the expansion-rings and are provided with equalizing-blocks 75, adapted to slide to and from the arms 72 and the ends 76 of the ring 73, the blocks 75, the arms 72, and the ends 76 having sockets therein, in which are seated bars 77 and 78, the latter having an adjustable extension end 79. The bars 77 78 are set so as to normally be inclined, as in Fig. 14, so that if the end 74 be forced toward the shaft 5 the bars will be brought nearly to positions in which they would be, in effect, lengthened, so as to force the ring 73 against the rim of the pulley and bind the two together frictionally. If the motion of the end 74 be reversed, the ring 73 will withdraw from the pulley by means of its inherent elasticity. The ends of the expansion-arms that are engaged by the sleeves, as 28, preferably have rollers.

The carriage comprises suitable connected frames 52 and 53, carried by four flanged wheels, as 54 and 55, upon the rails *c c'*. The pulleys *l* and *m* are rotatively mounted in the carriage. Pivoted to the carriage is a yoke 56, the upper portion of which is connected to the opposite ends of the carriage by opposing springs 57 and 58, the yoke being supported by the pivot-bolt 59. A bracket 60 is attached to the carriage and projects from the outside of the frame 52. The safety carrier-hooks *h h'* are attached to the yoke 56, one at either side of the carriage, each hook having a weighted guard-arm 61 pivoted thereto, each arm having a guard 62, adapted to close the opening of the hook when engaged by the axle 63 of the sheave *n* as it descends after having been raised above the guard from the hook. The guard normally stands above the hook, so that the axle may descend into the hook when stopped below the guard.

The tail-stock *e*, having the sheave *k*, is supported by a suitable housing connected with the timbers *a* and is provided with springs 64, strained so as to resist the load. The tail-stock *g*, having the sheave *p*, is mounted slidingly on the rail *c* and is provided with an adjusting and retaining screw 65 for taking up slack in the carriage-cable *r*.

The lifting-cable *q* is practically continuous, inasmuch as its two ends proper are attached to the drum *j*, and both leads are wound together about the drum, the cable extending from the drum *j* over the carriage, preferably upon guide-rollers 51, to and over the sheave *k*, thence over the sheave *l*, thence down and under the sheave *n*, thence up and over the sheave *m*, and thence to the drum *j*. The carrying-cable *r* is also practically continuous, as its two ends are attached to the bracket 60 and extend to and about the sheave *p* and about the pulley *o*, by which it may be driven to move the carriage.

It will be understood that both the cables *r* and *q* may be moved in either direction by the power-machine, the motions being controlled by means of hand-levers 66 and 67, connected to the shifting rods 6 and 7. In the present case the motive force is designed to be obtained from one driving-shaft, one of the belts to the power-machine being crossed for reversing the motion of the cables.

Figures 1, 2, 3, 4:
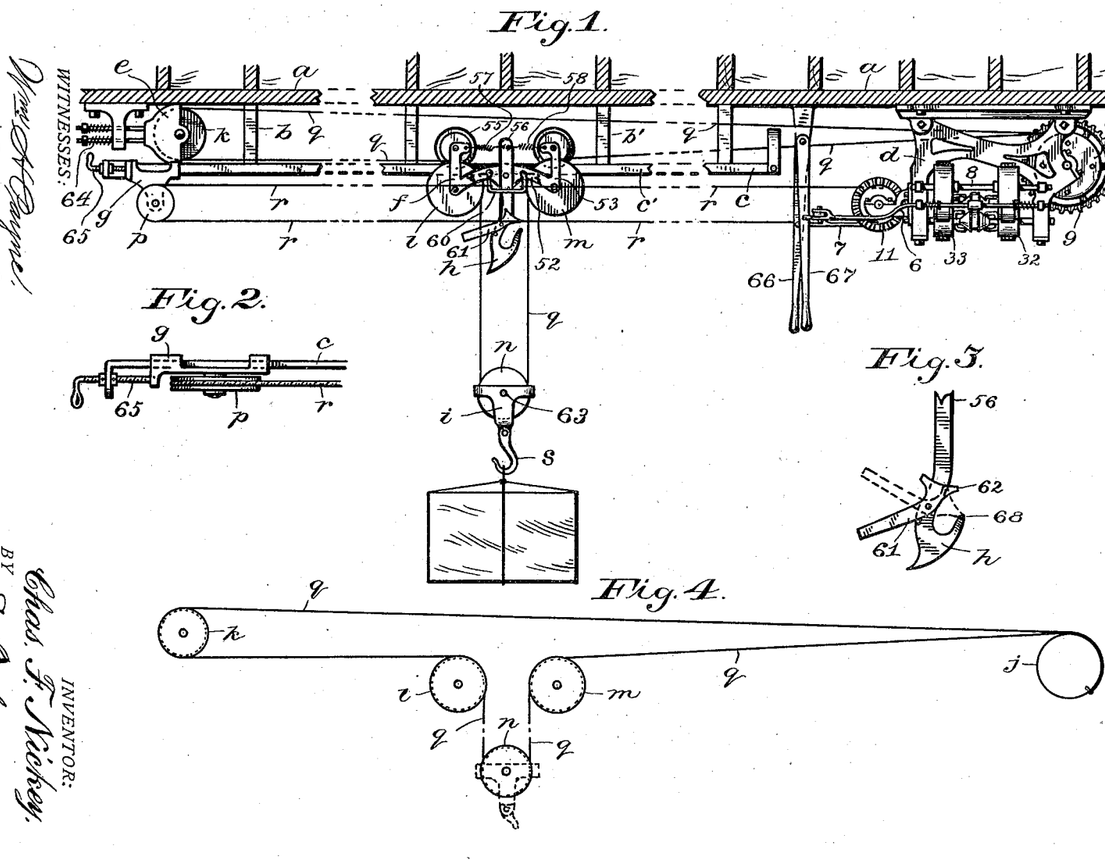
Figure 1 illustrates apparatus constructed and erected in accordance with my invention in a side elevation view, parts of which are broken away and parts of which are in vertical longitudinal section.
Fig. 2, a detail view showing the adjustable spreading-pulley for the carrying-cable.
Fig. 3, a detail view of one of the safety-hooks.
Fig. 4, a diagrammatic side view of the lifting-cable and pulleys, showing the course of the cable in its connection with the lifting-drum.
Figure 5:
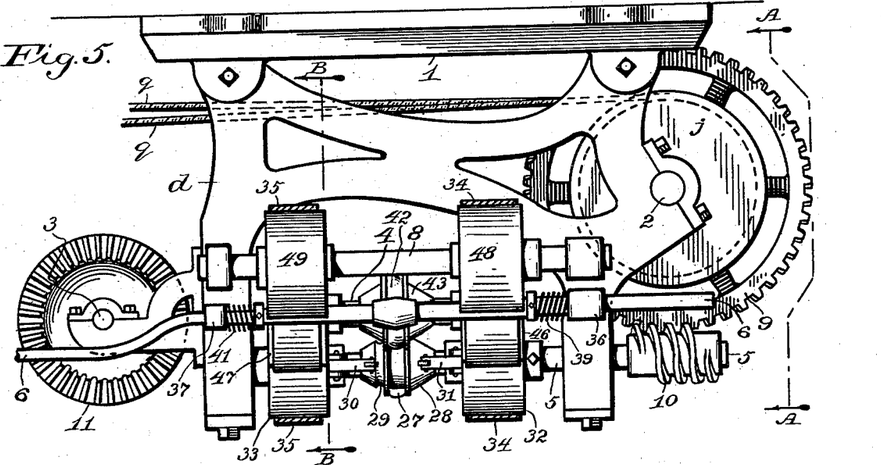
Fig. 5, a right-side elevation of the power-machine.
Figure 6:
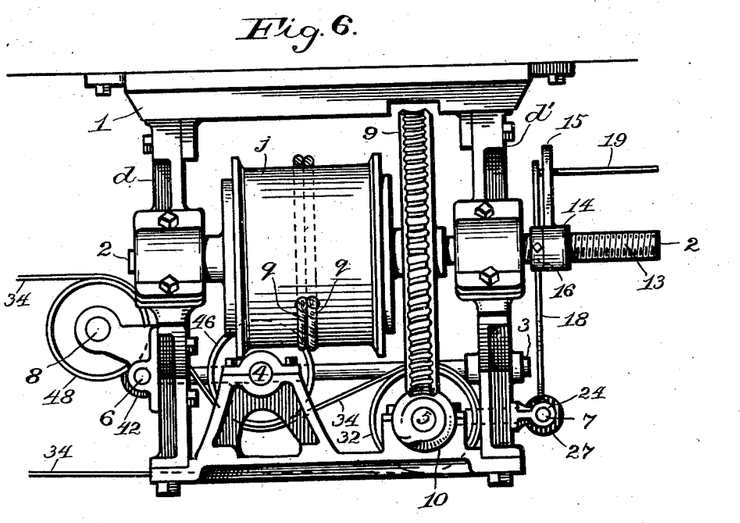
Fig. 6, a rear elevation of the power-machine, or looking from the line A A in Fig. 5.
Figure 16:
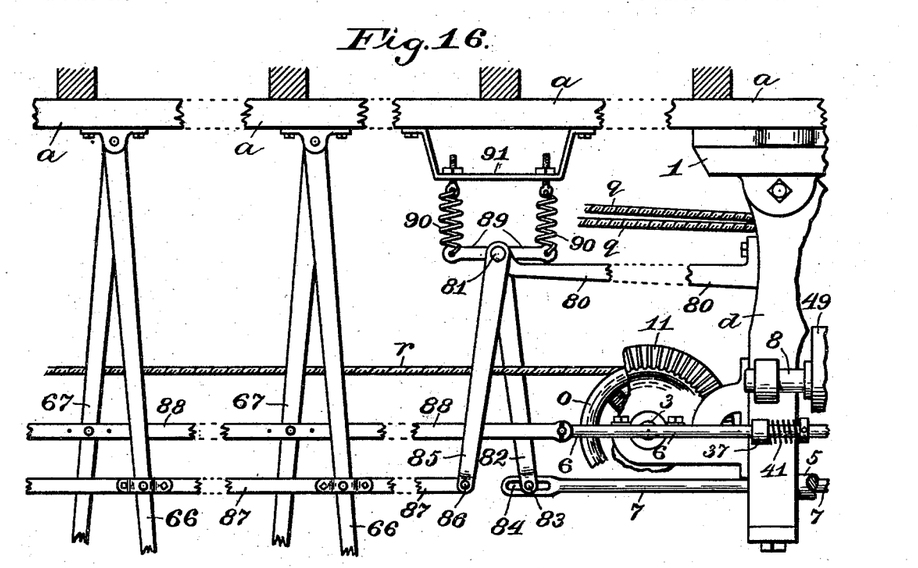
Fig. 16, a fragmentary side elevation of the hand-levers for controlling the operation of the apparatus and showing their connections and arrangement.
Figure 17:
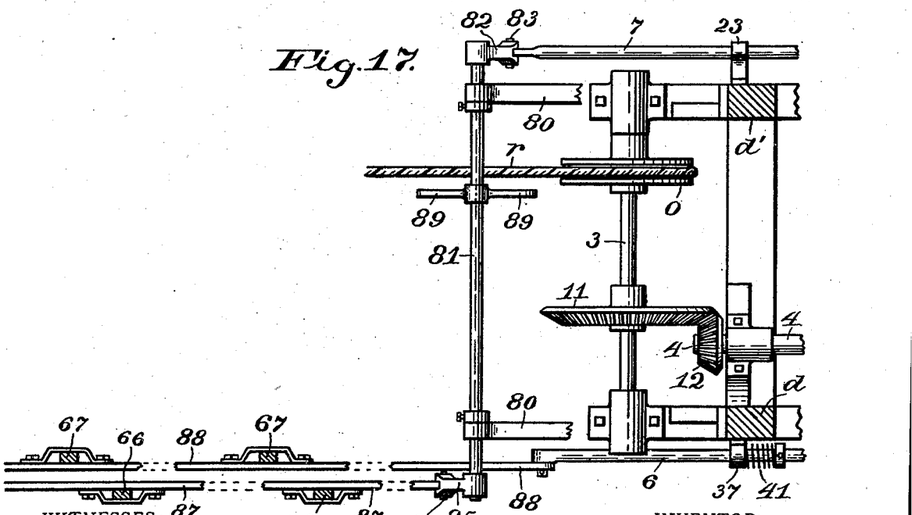
Fig. 17, a top plan view of the parts shown in Fig. 16, minor parts being omitted.

In Fig. 1 the hand-levers 66 and 67 merely indicate the means whereby the apparatus may be controlled, the levers being situated so as to not obscure other parts in the drawings. In Figs. 16 and 17 are shown the details of construction and preferable arrangement of the levers and the parts whereby they are connected to the shifting bars or rods 6 and 7. As the operator should be near the load, it is obvious that the hand-levers should be within his reach, and while one pair of levers, as in Fig. 1, may be sufficient where the track is short it is desirable to supply a plurality of connected levers when the track is of considerable length. As preferably constructed, brackets 80, of suitable length, are attached to the frame *d d'*, and in the brackets I mount a rock-shaft 81, having an arm 82, provided with a wrist-pin 83, extending through a slot 84, formed in the end of the bar 7, so that while the bar 7 may move without moving the arm 82 the latter may be employed to move the bar 7 in either direction. An arm 85 is also secured to the shaft 81, and it has a pivot-pin 86, to which is connected a shifting bar 87, which is practically an extension of the bar 7 transferred to the opposite side of the power-machine, the bar 87 being also connected to a suitable number of levers 66. A shifting bar 88 is connected to the bar 6, being a practical extension thereof, and is also connected to a suitable number of levers 67, the levers 66 and 67 being situated in pairs near together and pivoted at their upper ends, whereby they and the bars connected thereto are supported. The shaft 81 is provided with oppositely-disposed fingers 89, to the ends of which are connected balancing-springs 90, that are adjustably connected with a bracket 91, which is suitably supported in a rigid position. The levers 66 and 67 and the arms 82 and 85 may normally hang in vertical planes, their angularity in the drawings being rather to avoid confusion.

Figure 7:
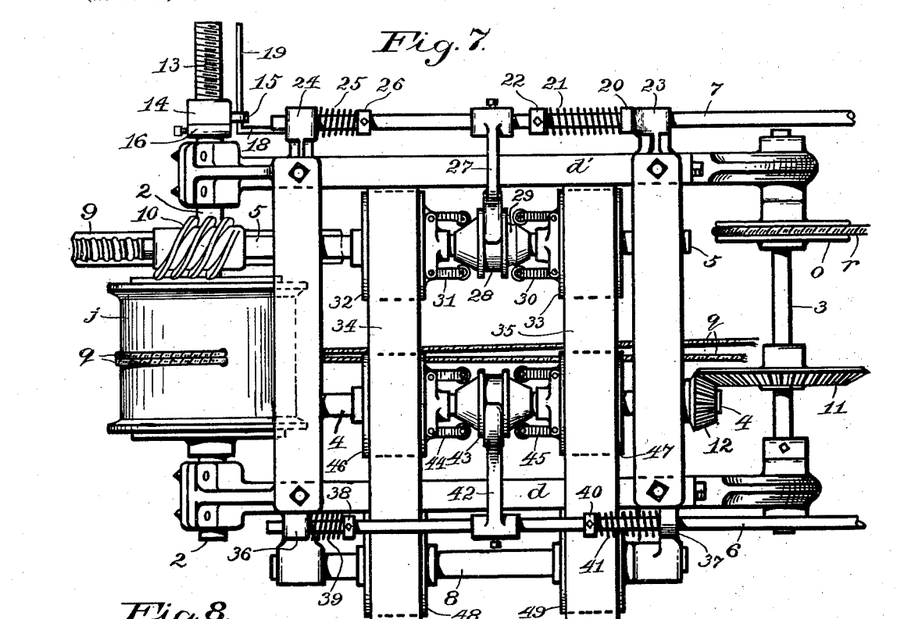
Fig. 7, an inverted plan view of the power-machine.
Figure 8:
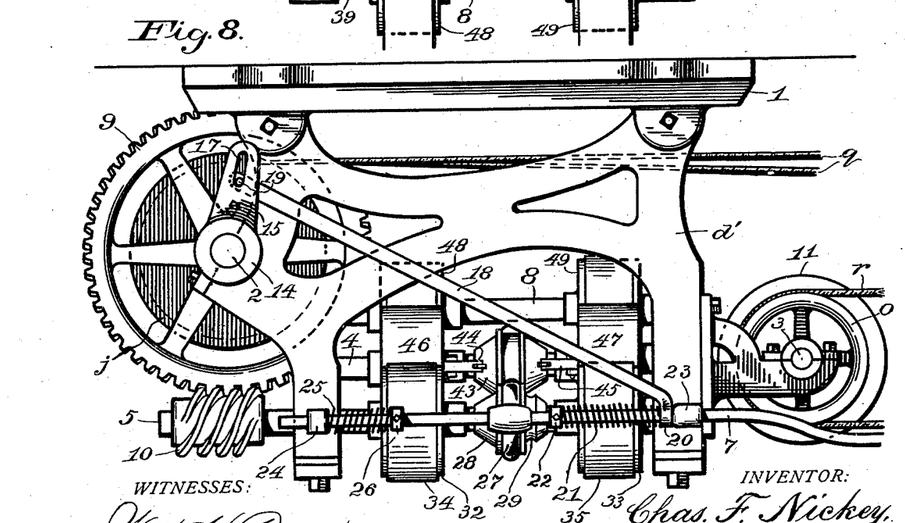
Fig. 8, a left-side elevation of the power-machine, showing particularly the automatic stopping mechanism.
Figure 9:
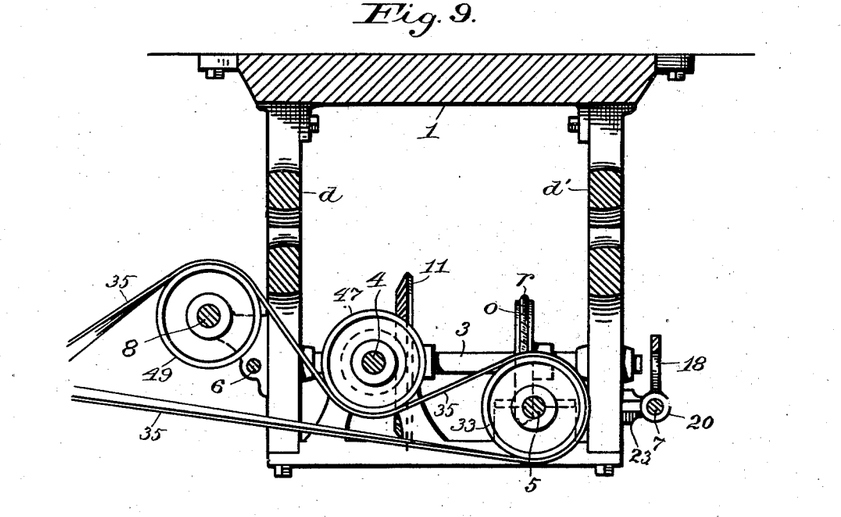
Fig. 9, a vertical transverse sectional view, as on a line B B in Fig. 5.
Figure 10:
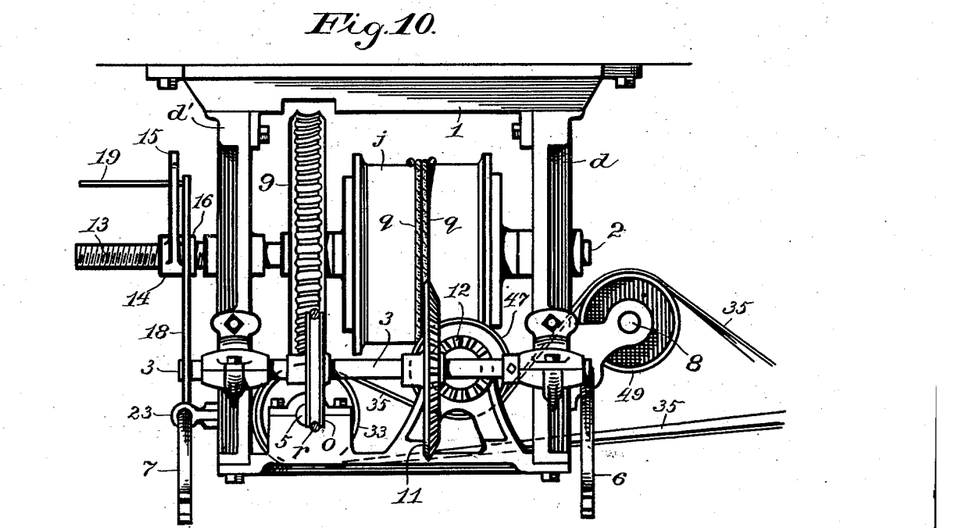
Fig. 10, an elevation of the front or end opposite that shown in Fig. 6.
Figure 11:
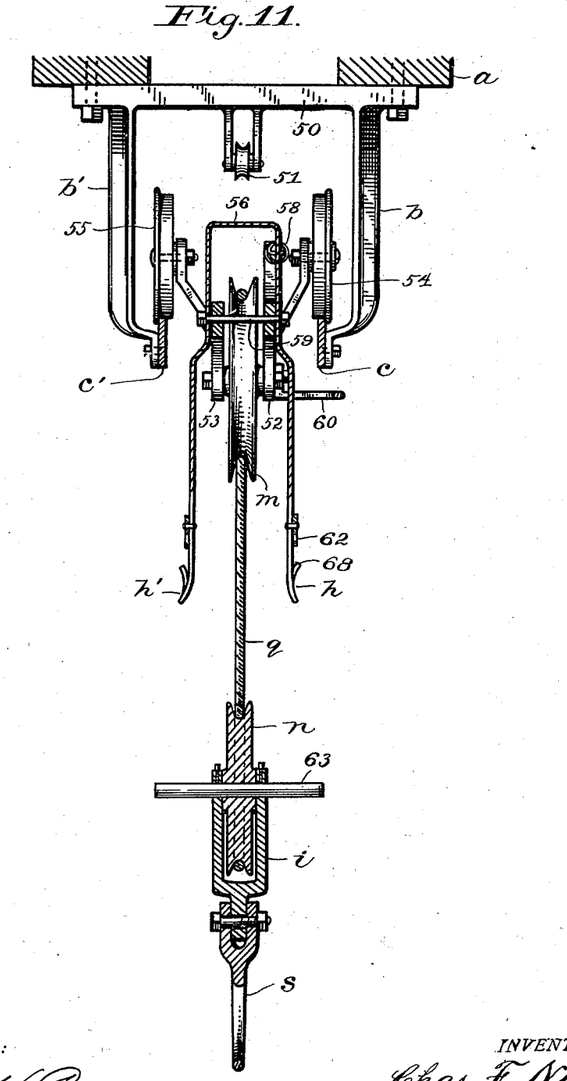
Fig. 11, a vertical transverse sectional view of the carriage and its track, showing connecting parts.
Figure 12:
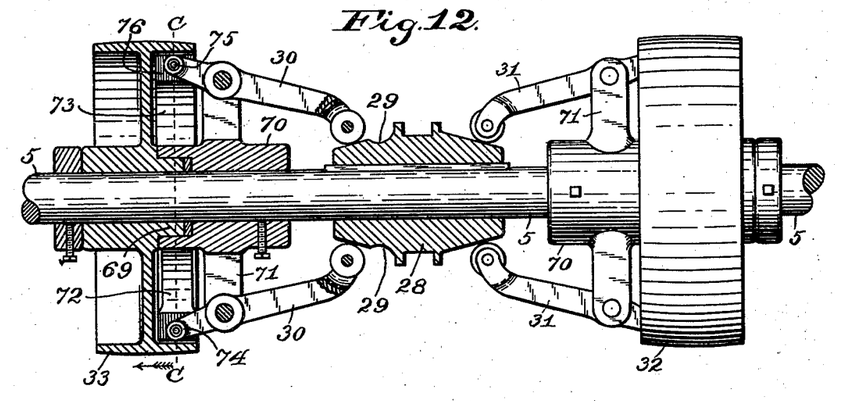
Fig. 12, a detail view showing friction-clutch pulleys employed in my apparatus, one pulley being seen externally and another being in central section, exposing the clutching devices.
Figure 13:
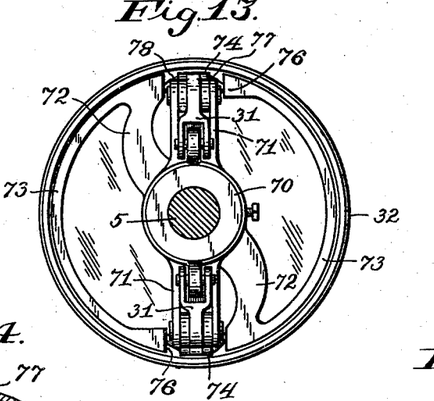
Fig. 13, a plan view of a pulley, showing the friction-rings therein.

In operation suppose that a load is borne by the lifting-hook *s* and the collar 14 removed a suitable distance from the stop-collar 16. If then the rod 7, Figs. 7 and 8, be moved toward the right-hand side, the sleeve 28 will spread the arms 30 until their ends drop into the groove 29, operating the clutch devices, and by means of the clutch-arms 72 the pulley 33 will drive the shaft 5, rotating the drum *j* and winding up the cable *q*, thus lifting the load without rotating the sheave *n*, since the cable moves with equal velocity over both of the sheaves *l* and *m* after the load has compressed the springs 64. The adjustment should be such that the axle 63 may engage the curved under sides of the hooks *h h'* and push the hooks out of its path against the tension of the spring 55 until the axle rises above the points 68 of the hooks, when the hooks will advance, so that if the axle now descend it must be caught by the hooks. At this period the collar 14 will have advanced and engage the collar 16, thereby becoming locked to the shaft 2 and forced to rotate with it, so that the arm 15 must pull the bar 18 and further compress the spring 21 until sufficient force is exerted upon the collar 22 to move the rod 7 and disengage the arms 30 from the groove 29, and thereby release the clutch from the pulley 33. The increased tension of the spring 21 will cause the sleeve 28 as it is released from the clutch-arms 30 to bound against the arms 31, and thus lock the reversing-pulley 32 to the shaft 5, so that thereby the motion of the drum will be reversed, allowing the load to bear down the axle 63 into the hooks *h h'*, by which the load will be supported while being carried to the place at which it is to be deposited. The reverse movement of the machine will be but momentary, since the spring 25 will be compressed to a greater degree than that of the spring 21 and cause the sleeve 28 to rebound from the arms 31 to a neutral position, when the machine will remain at rest. It will be seen that while the machine is in reversed motion the collar 14 will become unlocked and the abnormal tension on the spring 21 relieved. The rod 6 may now be moved in either direction, corresponding to the direction in which it is desired to move the load, the arm 42 actuating the sleeve 43, so as to operate the clutch for either of the pulleys 46 or 47 in the usual manner, so that the cable $r$ would be actuated, and thereby move the carriage and its load, while the sheaves may freely rotate under the cable $q$ with no more strains thereon than what may be occasioned by the weight of the lifting-hook and its sheave and frame. When it is desired to remove the load from the safety carrying-hooks $h\,h'$ and let the load descend, the rod 7 should be moved to the right, as before for lifting the load, and the same action will take place as before as relates to the automatic stopping of the machine when the axle is elevated above the hook-points 68, except that the rod 7 by means of its lever should be manually held a moment until the axle 63 rises above the guards 62, when reversal may occur, and as the axle descends it will engage the guards 62 and push them down upon the points 68, thus closing the openings to the hooks and at the same time causing the hooks to be pushed back from the downward path of the axle. The spring 56, coacting with the spring 55, provides cushions for absorbing the thrusts when starting and stopping the carriage when a load may be on the safety-hooks.

The control of the operation of the apparatus is preferably accomplished manually by means of the hand-levers and connections, except as above described, when the load is being placed upon and removed from the carrying-hooks, although in some cases an advantage may be found in duplicating certain elements and providing grooves or recesses in the faces of the sleeve 43 and the other face of the sleeve 28, so as to provide for automatically stopping every movement of the power-machine. It will be understood that by reason of the slot 84 the bar 7 may be operated automatically without restraint arising from its connection with the arm 82, and it will be seen that the springs 90 normally hold the arm 82 in a proper neutral position.

This apparatus is adapted for use in many places, such as canning-works, mines, factories, and foundries.

Having thus described my invention, what I claim, and desire to secure by Letters Patent, is—

1. Lifting and conveying apparatus including a carriage, a lifting-cable, a safety carrying member having an opening therein, a lifting-sheave frame, a guard mounted movably at the front of the opening of the carrying member, means whereby the guard may normally be prevented from closing the opening, a member attached to the sheave-frame adapted to engage the guard and push the same across the opening of the hook, and a power-machine operatively connected with the lifting-cable.

2. Lifting and conveying apparatus including two track-rails, a carriage supported by and between the rails, a carrying-cable, a lifting-cable, a pair of safety carrying-hooks pivoted to the carriage and having each a guard adapted to close the openings of the hooks, a sheave-frame carried by the lifting-cable and having projections adapted to enter the safety carrying-hooks, and means whereby the sheave-frame may be elevated and the projections thereof automatically transferred into the safety carrying-hooks.

3. Lifting and conveying apparatus including a track, a carriage mounted upon the track, a lifting-cable, a safety carrying-hook pivoted to the carriage, a guard adapted to close the opening of the hook, a sheave-frame carried by the lifting-cable and having a member adapted to enter the opening of the hook and also adapted to operate the guard so as to close the opening.

4. Lifting and conveying apparatus including two track-rails, a carriage mounted upon the rails, a lifting-cable, a carrying-hook pivoted to the carriage and having a guard adapted to close the opening of the hook, a sheave-frame carried by the lifting-cable and having a member adapted to enter the carrying-hook, means whereby when the member may have been elevated from the hook the guard will be operated and close the hook, a cushion for the safety carrying-hook, and means coacting with the lifting-cable whereby the sheave-frame may be elevated and the member thereof automatically transferred into the hook.

5. Lifting and conveying apparatus including a track, a carriage mounted on the track, a pair of sheaves mounted on the carriage, a lifting-hook sheave, a tail-sheave, a safety carrying-hook pivoted in the carriage and having a hook-guard movable across the opening of the hook, a member attached to the lifting-hook sheave and adapted to operate the guard and cause the same to close the hook-opening, a lifting-cable extending over the tail-sheave and the pair of carriage-sheaves and under the lifting-hook sheave, a carrying-cable, and a cushion operating against the safety carrying-hook whereby to absorb the thrusts thereon when operating the carriage with a load suspended in the carrying-hook.

6. Lifting and conveying apparatus including two track-rails, a carriage mounted upon and between the rails, a pair of safety carrying-hooks pivoted at the sides of the carriage, a yoke connecting the pair of hooks, cushion-springs connected with the pair of hooks, guards for closing the openings of the hooks, a lifting-hook sheave-frame operating at times between the pair of hooks and having projecting members adapted to enter the hooks and also operating the guards so as to close the openings of the hooks, and means whereby the guards may be automatically operated to withdraw from the openings of the hooks.

7. In lifting and carrying apparatus, the combination of a frame, two pairs of friction-clutch pulleys mounted in the frame, two belts operating the two pairs of pulleys, a lifting-drum operatively connected with one pair of the pulleys, a cable-driving pulley operatively connected with the other pair of the pulleys, means whereby to operate the clutching members of the pulleys, a pair of track-rails, a carriage mounted upon and between the track-rails, a lifting-hook and sheave therefor, a pair of sheaves mounted in the carriage, a tail-sheave at the ends of the track-rails, a lifting-cable extending over the tail-sheave and the pair of sheaves and under the lifting-hook sheave and attached to the lifting-drum, a carrying-cable connected with the carriage and running over the cable-driving pulley, a spreading-sheave for the carrying-cable, safety carrying-hooks pivoted to the carriage, guards at the openings of the carrying-hooks, cushions for the carrying-hooks, and members attached to the lifting-hook sheave-frame adapted to enter the carrying-hooks and to also engage the guards at either upper or lower sides thereof.

8. In lifting and carrying apparatus, the combination of a power-machine comprising a base, a pair of frames attached to the base, a lifting-drum, and means whereby to operate the drum in either rotative direction, a carriage operated by the power-machine, a lifting-cable attached to the drum and operating in connection with the carriage, a lifting device connected with the lifting-cable, a safety carrying member supported directly by the carriage whereby to carry a load independently of the lifting-cable, the lifting device being adapted to form connection with the safety carrying member, a screw-threaded shaft driven in unison with the lifting-drum, a collar having screw-threads on said shaft and having an arm provided with an aperture, an adjustable stop member for the collar, a pull-bar having a stud extending through said aperture and operatively connected with means whereby the motion of the machine may be reversed and then stopped when engagement is effected between the lifting device and the safety carrying member.

9. In lifting and conveying apparatus, the combination of a lifting-drum, a track, a carriage, a pair of sheaves mounted in the carriage, a lifting-hook sheave, a spreading-sheave at the end of the track, a lifting-cable secured to the lifting-drum and having two strands extending from the same side of the drum together, the cable extending over the carriage-sheaves, the spreading-sheave and under the hook-sheave continuously from and back to the drum; a safety carrying member attached to the carriage, a member attached to the lifting-hook sheave and adapted to engage the safety carrying member, a friction-clutch pulley operating the lifting-cable, and automatically-operated means whereby, when the member attached to the hook-sheave has been detached from the safety carrying member, the lifting-hook sheave will be automatically stopped in its ascent and its motion reversed and the sheave caused to descend.

10. In lifting and conveying apparatus, the combination of a power-machine comprising a base, frames attached to the base, a drum-shaft having screw-threads, a lifting-drum secured to said shaft, a rotative lifting-shaft having oppositely-moving loose pulleys, clutches for said pulleys having clutch-arms, a shifting sleeve on said lifting-shaft having a groove to be engaged by said arms of one of said clutches, a shifting rod, an arm attached to the shifting rod and engaging said sleeve, gear-wheels operatively connecting the said drum and said lifting-shaft, springs normally holding said shifting rod in mid-position, a threaded collar mounted on said threads of said drum-shaft and having an arm provided with an aperture, a stop member for said collar whereby the same may be locked to its supporting-shaft, a pull-bar having a stud extending through said aperture and having connection with one of said springs on said shifting rod whereby said shifting collar may be automatically operated, a track, a carriage, a lifting-cable, a carrying-cable, and means whereby to operate the carrying-cable.

11. In lifting and conveying apparatus, the combination of a power-machine, a lifting-drum, a lifting-cable, a lifting member operated by the lifting-cable, a carriage, a yoke pivoted to the carriage and having safety carrying-hooks attached thereto, guards and guides for said hooks, a balance-spring for said hooks, a carrying-cable, means whereby the carrying-cable may be operated, means whereby to operate the lifting-drum and the lifting-cable, an automatic mechanism operated by the power-machine and coacting with the safety carrying-hooks, whereby a load raised by the lifting member may be transferred to the safety carrying-hooks.

12. In lifting and conveying apparatus, the combination of a power-machine, a lifting-drum, a lifting-cable, a track, a carriage, a safety carrying-hook attached to the carriage, a lifting member operated by the lifting-cable, a carrying-cable, means whereby the carrying-cable may be operated, a lifting driving-shaft operatively connected with the lifting-drum, a pair of friction-clutch pulleys having each a pivoted operating-arm mounted on the driving-shaft, a shifting sleeve mounted on the driving-shaft having oppositely-disposed conical ends in one of which is a groove or depression to receive the end of one of said pivoted operating-arms, a spring-pressed shifting bar, a shifting arm in connection with the shifting bar and the shifting sleeve, a pull-bar in connection with the shifting bar, means operated in unison with the lifting-drum whereby when the lifting member may be in proximity to the safety carrying-hook, the pull-bar may be automatically operated and cause one conical end of said sleeve to be disengaged from one of said operating-arms and the opposite one of said conical ends to be engaged with an opposing one of said operating-arms and then released therefrom, whereby the lifting member may be automatically connected to the safety carrying-hook.

13. In lifting and conveying apparatus, the combination of the plurality of parallel shafts, the frames for the shafts, the pair of pulleys on each of said shafts, the clutches for the pulleys, the shifting sleeves for the clutches, the belts driven in opposite directions one of which drives a pulley on each of said shafts in a series and the other one of which drives a pulley on each of said shafts in another series, two of said pulleys on one of said shafts being arranged to deflect the belts from their courses so as to increase the contact with the intermediate pulleys, the lifting-drum, the drum-shaft, the gear-wheels connecting the drum-shaft with one of said parallel shafts, the carrying-cable pulley, the shaft for the said pulley driven by another one of said parallel shafts, the lifting-cable attached to said drum, the carrying-cable extending about said cable-pulley, the carriage having the safety carrying-hooks, the tail-stock having the cushion-springs, the sheave in said tail-stock and spreading said lifting-cable, the lifting-hook carried by said cable, the bracket attached to said carriage and to said carrying-cable, and the tail-stock having the adjusting-screw for said carrying-cable.

14. In lifting and conveying apparatus, the combination of a frame, a power-machine mechanism supported by the frame, a plurality of series of hangers, a track-rail supported by each series of hangers between the two series thereof, a carriage supported by and between said rails, guide-pulleys supported above and independently of said carriage, safety carrying-hooks pivoted to said carriage and having the guards adapted to close the openings thereof, the lifting-hook having the sheave-frame connected therewith provided with the projecting axle adapted to enter said carrying-hooks, the lifting-cable running over said guide-pulleys and operating to lift said axle into engagement with said carrying-hooks, the carrying-cable connected to said carriage, and means for actuating said cables.

15. In lifting and conveying apparatus, the track composed of parallel rails spread apart, the carriage, the flanged wheels on the rails supporting the carriage between said rails, a yoke pivoted to said carriage and spring-pressed to a mid-position and provided with the carrying-hooks having the operative guards, the sheaves at either side of said yoke, the lifting-hook, the sheave having the projecting axle, and the lifting-cable whereby said axle may be placed in said carrying-hooks, in combination with the power-machine having the reversible lifting-drum connected with said lifting-cable, and interlocking mechanism operated by the power-machine whereby said lifting-cable may be automatically stopped when said axle is deposited in said carrying-hooks.

16. In lifting and conveying apparatus, the track, the carriage, the power-machine having the carrying-cable pulley, the adjustable tail-pulley, the bracket secured to the carriage and extending from the side thereof, the carrying-cable having its two ends attached to said bracket and extending over said carrying-cable pulley and said tail-pulley, and the lifting-cable operating in connection with said carriage, in combination with a power-machine whereby to operate said cables.

17. In lifting and conveying apparatus, the track, the carriage, the lifting-cable, means whereby to operate the lifting-cable, the lifting-sheave supported by the lifting-cable, the tail-stock and the spreading-sheave for said cable, the pair of sheaves supported by the carriage and engaged by said cable, the pair of separated safety carrying-hooks attached to the carriage, and the frame connected with said lifting-sheave and entering between the pair of carrying-hooks and provided with the extended axle extending beyond said hooks laterally and engaged thereby.

18. In lifting and conveying apparatus, the power-machine frames, the parallel transversely-disposed shafts mounted in said frames, the lifting-drum on one of said shafts, the gear-wheel operatively connected with said drum, means for driving said gear-wheel in either rotative direction, the clutching mechanism, the pull-bar operatively connected with said clutching mechanism and automatically operated by means connected with said shaft, the conveying-cable pulley on the other one of said shafts, means for actuating said pulley, the conveying-cable, the lifting-cable, and the lifting-hook, in combination with a carriage having means whereby to receive the lifting-hook and relieve the lifting-cable of the load thereon.

19. In lifting and conveying apparatus, the track, the carriage, the lifting-cable, the power-machine, the lifting-hook frame having the lateral projections, the pair of carrying-hooks pivoted to the carriage, and the guards having the arms pivoted to said carrying-hooks.

20. In lifting and conveying apparatus, a lifting-drum shaft, a lifting-drum, a lifting driving-shaft, gear-wheels connecting the drum-shaft and the driving-shaft, reversible means whereby the driving-shaft may be actuated, a screw operated in unison with the drum-shaft and having an adjustable stop thereon, a collar mounted movably on the screw and having an apertured arm, a spring-pressed shifting bar connected with the reversible means, a pull-bar connected with the apertured arm and also with the shifting bar, a track, a carriage, and a lifting-cable.

21. In lifting and conveying apparatus, a driving-shaft, a pair of opposing friction-clutch pulleys having pivoted operating-arms, a shifting sleeve having conical ends one of which is provided with an annular groove engaged by one of said operating-arms, a shifting bar connected with said sleeve, a pull-bar connected with said shifting bar, a movable arm operatively connected with and actuating said pull-bar, a lifting-drum, a lifting-cable, a track, a carriage, and a lifting-hook.

22. In lifting and conveying apparatus, a track, a carriage, a yoke pivoted to the carriage and having a pair of spread carrying-hooks attached thereto, a lifting-sheave, a lifting-sheave frame entering between the pair of carrying-hooks and having projections extending laterally beyond the said hooks and adapted to be received and supported thereby, a movable guard for said hooks adapted to close the openings to said hooks when said projections are elevated above the guards and permitting the projections to enter the hooks when below said guards.

23. In lifting and conveying apparatus, a track, a carriage, a lifting-cable, a lifting-hook, and a safety carrying-hook provided with a pivoted guard-arm having a guard adapted to close the opening to the hook and normally withdrawn therefrom, and a member connected with the lifting-hook whereby the upper part of the guard may be engaged and operated to close said opening, said member being adapted to enter said opening below the said guard.

24. In lifting and conveying apparatus, a drum-shaft, a lifting-drum, a screw-thread on the drum-shaft, an adjustable stop on the drum-shaft, a collar mounted on the screw-thread and having an arm attached thereto, means for driving the drum-shaft, a pull-bar operated by said arm, members connected with the pull-bar and also with the means for driving the drum-shaft, whereby the drum may be automatically stopped; a track, a carriage, and a lifting-cable.

25. In lifting and conveying apparatus, a rotative shaft, two friction-clutch pulleys having pivoted operating-arms, a shifting sleeve having conical ends engaged by said arms one of said ends having a groove in the surface thereof engaged by one or more of said arms, a shifting bar mounted in bearings and operatively connected with said shifting sleeve, a pair of opposing springs normally holding said shifting bar in mid-position, a pull-bar engaging one of said springs whereby said bar may be elastically operated, automatic means whereby said pull-bar may be actuated, a lifting-drum, and a lifting-cable.

26. In lifting and conveying apparatus, the power-machine frame, the pulley 33, the pulley 47 having its axis in a plane higher than the plane of the axis of the pulley 33, the pulley 49 having its axis in a plane higher than the plane of the pulley 47, and the belt extending from the side of the machine-frame partially about the pulley 33 and thence partially about the pulley 47 and thence partially about the pulley 49, whereby the pulleys 33 and 49 may be driven in opposite directions by one belt moving in either direction, the clutching mechanism, the lifting-drum, and the lifting-cable.

27. In lifting and conveying apparatus, the combination of the machine-frame, the friction-clutch pulleys, the driving-shafts, the lifting-drum, the carrying-cable pulleys, the track, the carriage having the safety carrying-hook, the lifting-cable, the lifting-sheave frame adapted to be supported by the carrying-hook, the shifting bar having the slot in the end thereof, the arm having the pin engaging said slot, the hand-levers operatively connected to said arm, the springs engaging said shifting bar, the pull-bar engaging one of said springs, the arm engaging said pull-bar and automatically operated in unison with the lifting-drum, and the carrying-cable.

In testimony whereof I affix my signature in presence of two witnesses.

CHARLES F. NICKEY

Witnesses:
 W. J. WARD,
 J. H. TRAVIS.